Dec. 31, 1957 J. F. LINSLEY ET AL 2,818,542
BRAKING CONTROL SYSTEMS FOR DIRECT CURRENT MOTORS
Filed June 16, 1955
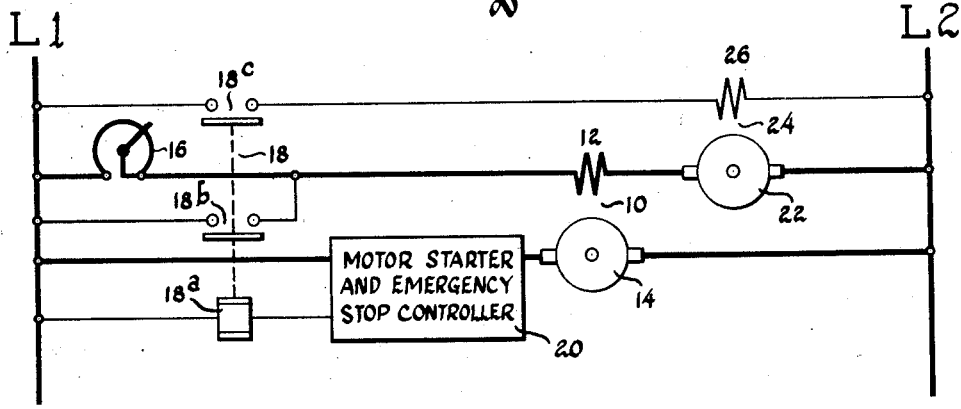
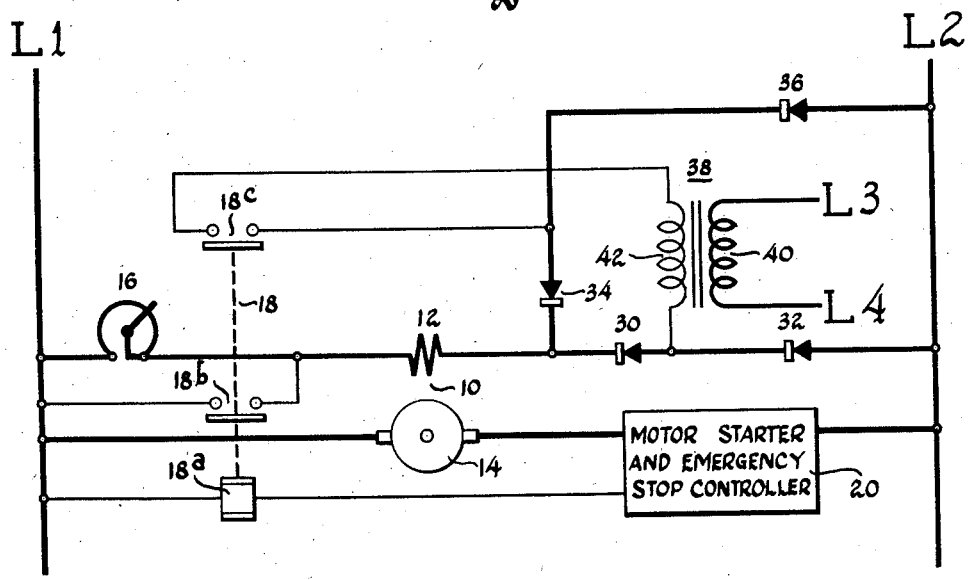
Inventors.
John F. Linsley,
Blakeslee D. Wheeler
By Grover G. Frater
Attorney

United States Patent Office 2,818,542
Patented Dec. 31, 1957

2,818,542

BRAKING CONTROL SYSTEMS FOR DIRECT CURRENT MOTORS

John F. Linsley, Lyndhurst, Ohio, and Blakeslee G. Wheeler, Wauwatosa, Wis., assignors to Cutler-Hammer, Inc., Milwaukee, Wis., a corporation of Delaware Application June 16, 1955, Serial No. 515,919

4 Claims. (Cl. 318—377)

This invention relates to braking control systems for direct current motors. More particularly it relates to motor field forcing systems for emergency braking of adjustable speed direct current motors.

Speed in direct current motors is an inverse function of shunt field magnetic flux. In emergencies which require that the motor be stopped in a very short time, the usual braking means may be augmented by forcing the motor shunt field to increase field flux rapidly to a higher-than-normal value. An object of the invention is to provide improved field forcing systems for braking shunt motors.

In certain industries, and particularly in the rubber industry, the safety requirements of Federal, state and industrial codes for emergency motor braking have become more and more stringent. Now many existing standard motor installations cannot be stopped within the required time interval. A more specific object of the invention is to provide a field forcing system which incorporates all of the present equipment including the motor, rheostat, field relay, etc., without reconnection of the motor or change in operating rating of any of these components.

Certain of these and additional objects and advantages of the invention which will hereinafter appear, are realized by the provision of an auxiliary unidirectional power source and means to connect this source to aid the regular field power source during the braking cycle.

Certain embodiments of the invention are illustrated in the accompanying drawings, it being understood that various modifications are possible to be made in the embodiment illustrated and that other embodiments of the invention are possible without departing from the spirit of the invention or the scope of the appended claims.

In the drawing, Figs. 1 and 2 illustrate diagrammatically alternative control systems each of which embodies the invention. In Figs. 1 and 2, the motor to be braked is designated 10 and has a shunt field winding 12 and an armature 14; L1 and L2 are direct current supply lines; the numeral 16 designates a field current control rheostat by which motor speed is adjusted; and a control relay 18 has an operating winding 18$^a$ and two normally open contacts 18$^b$ and 18$^c$.

In both figures, the motor armature 14 and coil 18$^a$ are connected across lines L1 and L2 in series with a motor starter and emergency stop controller 20. This controller comprises appropriate main contactors for starting and stopping the motor, accelerating contactors and resistors and means to energize coil 18$^a$ when an emergency stop is required. If normally closed contacts are substituted for contacts 18$^b$ and 18$^c$, controller 20 is arranged to de-energize coil 18$^a$ when an emergency stop is required.

In Fig. 1, rheostat 16 is connected in series circuit with field winding 12 and the armature 22 of a direct current generator 24 across lines L1 and L2. The armature 22 is rotated by a prime mover not shown. The field winding 26 of generator 24 is connected in series with contact 18$^c$. Contact 18$^b$ is connected in shunt with rheostat 16.

When an emergency stop is required, coil 18$^a$ is energized. Contacts 18$^b$ are closed to by-pass rheostat 16 and apply the full voltage of source L1—L2 to field winding 12. At the same time contact 18$^c$ closes to allow current flow in field winding 26. Thereupon a generated voltage which aids the voltage across supply lines L1 and L2 appears across generator armature 22. Accordingly, current in field winding 12 is increased rapidly to a value above normal and motor 10 is braked.

In Fig. 2, rheostat 16 is connected across lines L1 and L2 through shunt field winding 12 and a parallel circuit. The parallel circuit has two branches one of which comprises two series connected half-wave rectifiers 30 and 32 and the other of which comprises two series connected half-wave rectifiers 34 and 36. Each of rectifiers 30, 32, 34 and 36 is connected in a direction of polarity to permit current flow through it in the direction from the positive line L2 to the negative line L1. A transformer 38 having a primary winding 40 connected to alternating current supply lines L3 and L4, has a secondary winding 42 connected in series with contact 18$^c$ from a point between rectifiers 30 and 32 in one branch of the parallel circuit to a point between rectifiers 34 and 36 in the other branch. With respect to winding 42, rectifiers 30, 32, 34 and 36 form a full-wave bridge rectifier having output terminals at the junction of rectifiers 30 and 34 and at the junction of rectifiers 32 and 36.

Upon closure of contact 18$^c$, alternating power from lines L3 and L4 will be converted to unidirectional power which is applied to field winding 12 in series with the power of source L1—L2 and in a direction of polarity to aid the source L1—L2. Contact 18$^c$ is closed by energization of coil 18$^a$ when emergency braking is required. At the same time contact 18$^b$ closes to by-pass rheostat 16 so that the full voltage across lines L1 and L2 is applied to field winding 12.

We claim:

1. In a field forcing system for a direct current shunt motor, in combination, a source of unidirectional shunt field voltage and an adjustable impedance element connected in series with the shunt motor field across said source, a second unidirectional voltage source and means to by-pass said impedance element and to apply the voltage of said second source to said series circuit in series and in like direction of polarity with the voltage of said source first mentioned.

2. The combination defined in claim 1 in which said second voltage source comprises a direct current generator having an armature connected in series with said series circuit and having a field winding, and in which said means comprises switch means for by-passing said impedance element and energizing the field winding of said generator from said source first mentioned.

3. In a field forcing system for a direct current motor, in combination, a motor having a shunt field winding, a source of unidirectional electrical current for normal excitation of said field winding, a rectifier unit, a series circuit comprising said source and said field winding and said rectifier in which the rectifier is polarized to permit current flow from the source through the field winding, a source of alternating electrical current, circuit means comprising said rectifier for converting the alternating electrical current to unidirectional current and applying the same to said series circuit in series with and in direction of polarity to aid said current first mentioned, and means for selectively permitting and not permitting application of the converted current to said series circuit.

4. In a field forcing system for a direct current motor, in combination, a motor having a shunt field winding, a source of unidirectional electrical current for normal excitation of said field winding, a full-wave bridge rectifier having alternating current input terminals and unidirectional current output terminals, a series circuit comprising said source and said field winding and the unidirectional current output terminals of said bridge rectifier in which the rectification elements of the bridge rectifier are polarized to permit current flow from the source through the field winding, a source of alternating electrical power connected to the alternating current input terminals of said bridge rectifier, and control means for said bridge rectifier and alternating power source for selectively preventing or permitting application of unidirectional power to said series circuit by said bridge rectifier.

References Cited in the file of this patent
UNITED STATES PATENTS 1,411,700     Holmes _____ Apr. 4, 1922